(12) United States Patent　　(10) Patent No.: US 8,174,738 B2
Ono et al.　　(45) Date of Patent: May 8, 2012

(54) IMAGE READ-OUT DEVICE AND IMAGE FORMING DEVICE

(75) Inventors: Nobuaki Ono, Yokohama (JP); Yasuo Sakurai, Yokohama (JP); Kiichiro Nishina, Yokohama (JP); Masahiro Itoh, Sagamihara (JP)

(73) Assignee: Ricoh Company, Ltd., Tokyo (JP)

( * ) Notice: Subject to any disclaimer, the term of this patent is extended or adjusted under 35 U.S.C. 154(b) by 518 days.

(21) Appl. No.: 12/500,222

(22) Filed: Jul. 9, 2009

(65) Prior Publication Data

US 2010/0007929 A1　Jan. 14, 2010

(30) Foreign Application Priority Data

Jul. 14, 2008　(JP) ................................ 2008-183065

(51) Int. Cl.
 *H04N 1/04* (2006.01)
 *H04N 1/46* (2006.01)
 *H01L 27/00* (2006.01)
 *H01J 40/14* (2006.01)

(52) U.S. Cl. ........ 358/474; 358/475; 358/483; 358/482; 358/512; 358/513; 358/514; 358/486; 358/496; 358/497; 358/509; 250/208.1; 250/239

(58) Field of Classification Search .................. 358/474, 358/475, 483, 482, 512, 513, 514, 486, 496, 358/497, 509; 250/208.1, 239
See application file for complete search history.

(56) References Cited

U.S. PATENT DOCUMENTS

| | | | |
|---|---|---|---|
| 4,638,987 A | 1/1987 | Sakurai | |
| 4,715,597 A | 12/1987 | Sakurai | |
| 5,124,837 A | 6/1992 | Ono | |
| 7,209,702 B2 | 4/2007 | Kohchi et al. | |
| 7,330,692 B2 | 2/2008 | Kohchi et al. | |
| 7,438,443 B2 | 10/2008 | Tatsuno et al. | |
| 7,446,953 B2 | 11/2008 | Itoh et al. | |
| 7,495,682 B2 | 2/2009 | Kohchi et al. | |
| 7,826,107 B2 * | 11/2010 | Chang et al. ................. | 358/474 |
| 2005/0088707 A1 | 4/2005 | Sakurai et al. | |
| 2006/0187500 A1 | 8/2006 | Sakurai | |
| 2006/0197822 A1 | 9/2006 | Sakurai | |
| 2006/0279961 A1 | 12/2006 | Sakurai | |
| 2007/0216969 A1 | 9/2007 | Nishina | |
| 2007/0279712 A1 | 12/2007 | Nishina | |
| 2008/0063313 A1 | 3/2008 | Nishina | |

(Continued)

FOREIGN PATENT DOCUMENTS

| | | |
|---|---|---|
| JP | 63-106740 | 5/1988 |
| JP | 6-303359 A | 10/1994 |
| JP | 2000-50031 | 2/2000 |
| JP | 2001-174932 | 6/2001 |

(Continued)

*Primary Examiner* — Charlotte M Baker
*Assistant Examiner* — Rury Grisham
(74) *Attorney, Agent, or Firm* — Dickstein Shapiro LLP

(57) ABSTRACT

The image read-out device comprises an integrally formed scanning optical unit in which a light source which emits light toward a document, a plurality of reflective mirrors reflecting the light which is emitted from the light source to the document and then reflected, an image forming lens converging the light reflected by a final reflective mirror which finally reflects the light, among the plurality of mirrors, and a light receiving sensor for receiving the light converged by the image forming lens are integrally mounted on a housing, the integrally formed scanning optical unit moving in a scanning direction and reading out an image of the document, wherein an opening is provided on each of top and bottom surfaces of the housing, and wherein the area of the opening provided on the bottom surface is equal or more than that of the opening provided on the top surface.

5 Claims, 4 Drawing Sheets

U.S. PATENT DOCUMENTS

| | | |
|---|---|---|
| 2008/0158533 A1 | 7/2008 | Shimizu et al. |
| 2008/0218724 A1 | 9/2008 | Nishina et al. |
| 2008/0278779 A1 | 11/2008 | Nishina et al. |
| 2009/0316225 A1* | 12/2009 | Fujioka et al. ............... 358/474 |

FOREIGN PATENT DOCUMENTS

| | | |
|---|---|---|
| JP | 2004-126447 | 4/2004 |
| JP | 2008-160577 | 7/2008 |

* cited by examiner

IMAGE READ-OUT DEVICE AND IMAGE FORMING DEVICE

CROSS-REFERENCE TO THE RELATED APPLICATION

This application is based on and claims the priority benefit of Japanese Patent Application No. 2008-183065, filed on Jul. 14, 2008, the disclosure of which is incorporated herein by reference in its entirety.

BACKGROUND OF THE INVENTION

1. Field of the Invention

The present invention relates to an image read-out device for use in a digital copying machine or an image scanner.

2. Description of Related Art

In an image read-out device, in which light is emitted from a light source toward an image surface, and the light reflected by the image surface is reflected by a mirror, and then reflected light is read out by an image sensor through an image forming lens, an image read-out device employing an integral type scanning optical system unit integrally storing these components together is well known.

Recently, the image read-out devices are often incorporated into copying machines such as digital compound machines.

The image read-out device may also be provided on a portable image scanner.

If the image read-out device is incorporated into a digital compound machine, it is preferable for it to be miniaturized. If the image read-out device is incorporated into an image scanner, since it is required to be lighter and compact, it is further preferable that it be miniaturized. Furthermore, it is desired that the image be clearer.

In order to respond to such needs, for example, JP-2001-174932-A1 proposes an image read-out device in which a read-out magnification is enhanced, and a width along a sub scanning direction is reduced by obtaining a short conjugated length employing a multi-reflective mirror which reflects luminous flux from a document several times.

Further, JP-2000-50031-A1 discloses an apparatus that positions a mirror optically nearest to a document surface side among a plurality of mirrors, between the optical axis and the document surface and located between an incident surface of the image forming lens and the read-out device, thereby obtaining a shorter conjugate length, enhancing the read-out magnification, and enabling miniaturization.

However, in any device, heat evolved by a light source or an image sensor is not considered, and thus the degradation of read-out accuracy occurring due to the thermal expansion of a member has not been alleviated.

As a read-out device in consideration of the thermal expansion of a member, for example, JP-2004-126447-A1 proposes an apparatus in which, by positioning a reflective mirror before or after an image forming lens and thus folding luminous flux back in a vertical upwards direction of a scanning unit, an image sensor such as CCD and the like is positioned above the image forming mirror in order not to give the heat evolved from the image sensor to the other optical elements.

However, positioning the image sensor above the integrally formed scanning optical system unit it leads to spoiling the appearance, and a user operating the apparatus happens to see the electrical wiring, which spoils the appearance of the apparatus.

Further, since the light source and the image sensor are contained within a carriage, the temperature in the carriage sequentially rises and, finally, thermally expands the other optical components in the carriage, thereby, the degradation of read-out accuracy cannot be avoided.

SUMMARY OF THE INVENTION

The present invention is made taken into account of the above-mentioned prior art problems and thus the object of the present invention is to provide an image read-out device which is made to be compact, by which an image read out is clear, thermal expansion of the optical components accompanying with the sequential temperature rise, and the read-out accuracy cannot be degraded.

In order to overcome the above-mentioned problems, one embodiment of the present invention provides an image read-out device comprising an integrally formed scanning optical unit in which a light source which emits light toward a document, a plurality of reflective mirrors which reflects the light which is emitted from the light source to the document and then reflected, an image forming lens converges the light reflected by a final reflective mirror which finally reflects the light, among the plurality of mirrors, and a light receiving sensor which receives the light converged by the image forming lens are integrally mounted on a housing, wherein the integrally formed scanning optical unit moves in a scanning direction and reads out an image of the document, wherein an opening is provided on each of top and bottom surfaces of the housing, and wherein the area of the opening provided on the bottom surfaces is equal or more than that of the opening provided on the top surface.

Further, another embodiment of the present invention provides an image read-out device wherein the opening formed on the top surface of the housing is an opening for exiting the light from the optical source toward the document.

Further, another embodiment of the present invention provides an image read-out device wherein an opening provided on a bottom surface of the housing is formed between the final reflective mirror among the plurality of reflective mirrors and a reflective mirror arranged just prior to the final reflective mirror.

Furthermore, another embodiment of the present invention provides an image read-out device wherein the final reflective mirror, the image forming lens, and the light receiving sensor are arranged via an attachment member provided on a bottom surface of the housing.

Still furthermore, another embodiment of the present invention provides an image read-out device wherein the image forming apparatus wherein it comprises the image read-out device.

DETAILED DESCRIPTION OF THE PREFERRED EMBODIMENTS

Preferred embodiments of the present invention will be described below in detail with reference to the accompanying drawings.

Figure 1:
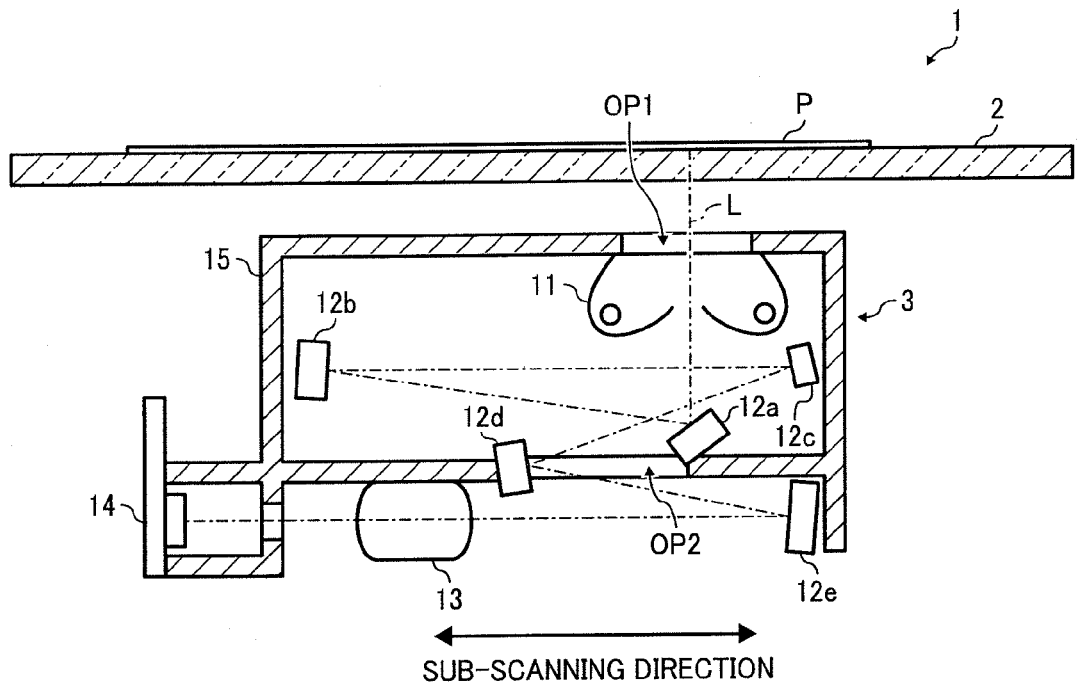
FIG. 1 is a view of a first embodiment of a document read-out apparatus according to the present invention.

FIG. 1 is a view of a first embodiment of a document read-out apparatus according to the present invention.

The document read-out apparatus shown in FIG. 1 is mainly comprised of a contact glass 2 on which a document P is set (or rest or placed) when reading out the document P, and an integrally formed scanning optical unit (hereinafter, referred to "the optical unit") 3 in which a document on a contact glass is read-out by integrally moving in a scanning direction.

Further, the optical unit 3 comprises a housing 15 in which a harogen lamp that radiates light toward the document P on the contact glass 2, or a light source 11 comprised of a fluorescent lamp, a plurality of reflective mirrors 12a to 12e which reflects the light L reflected from the document P and guides the reflected light to a light receiving sensor, an image forming lens 13 which converges the reflected light reflected from a final reflective mirror 12e (a reflective mirror which finally reflects the light) among a plurality of reflective mirrors, and a light receiving sensor 14 which receives the converged light and reads out an imaginary information therefrom, are mounted thereon.

Furthermore, the optical unit 3 is provided on an upper surface (a document surface side) of the housing 15 with an opening OP1 for exiting light from a light source 11 toward the document.

Meanwhile, in the optical unit 3 according to the present invention, all of the constituent features are not contained in the housing, but the image forming lens 13, the light receiving sensor 14, and the reflective mirror 12e nearest to the image forming lens 13 are arranged on an outer surface side of the housing 15. On a bottom surface of the housing is formed with an opening OP2.

The opening OP1 has a length such that the length in a secondary scanning direction perpendicular to the main scanning direction thereof is adapted to be equivalent or greater than that of the main scanning direction (the length in a main scanning direction of each opening is adapted to be equivalent).

With this arrangement, heat evolved by the light source 11 can escape from the opening OP1 provided on the upper surface and thus cool air can flow in from the opening OP2 provided on the bottom surface.

If the length of the opening OP2 is set larger than that of the opening OP1 in the secondary scanning direction, the cool air can be effectively flown in and heat within a unit can be discharged from the opening OP1.

In the current embodiment, although, as an opening for allowing the heat evolved by the light source to escape, an opening for exiting light from the light source 11 toward the document P is employed, the opening may be provided on another place of an upper surface of the housing.

Furthermore, in this embodiment, although the number of reflective mirrors is adapted to be five, the number thereof is not limited thereto. However, regardless of the number of reflective mirrors employed, a final mirror nearest the image forming lens 13 is needed to provide outside the housing 15.

Figure 2:
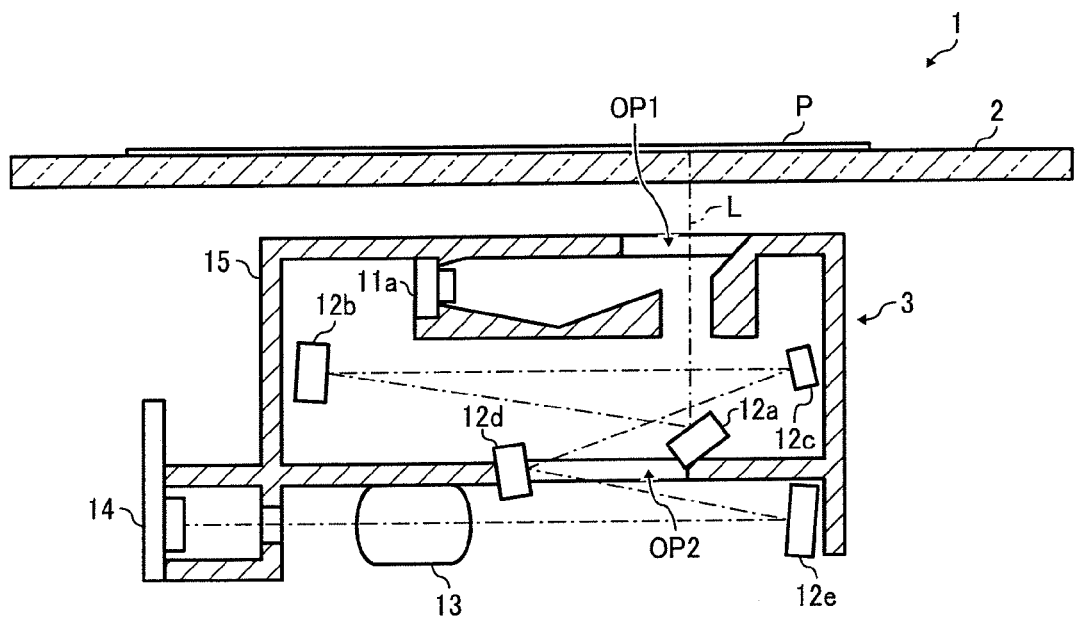
FIG. 2 is a view of a variant for the first embodiment of the document read-out apparatus according to the present invention.

FIG. 2 is a view illustrating a variant of the first embodiment of the document read-out device according to the present invention.

In this embodiment, the difference from the arrangement of FIG. 1 is only the light source which emits the light and the other structural features are equivalent.

Different from the light source in the example of FIG. 1, a light source 11b in this variant employs a LED (Light Emitting Diode) and the like. For this reason, since the evolved heat amount of the light source is made lesser, it is possible to make the upper surface opening OP1 of the housing smaller.

Figure 3:
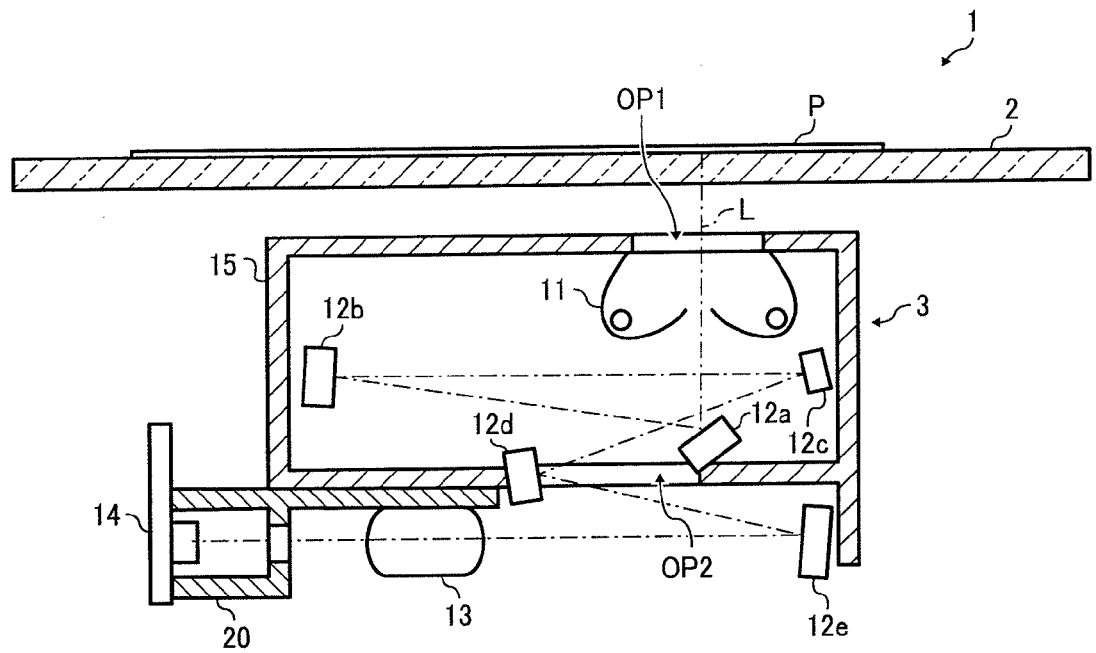
FIG. 3 is a view of a second embodiment of the document read-out apparatus according to the present invention.

FIG. 3 is a view illustrating a second embodiment of a document read-out device according to the present invention.

Figure 4:
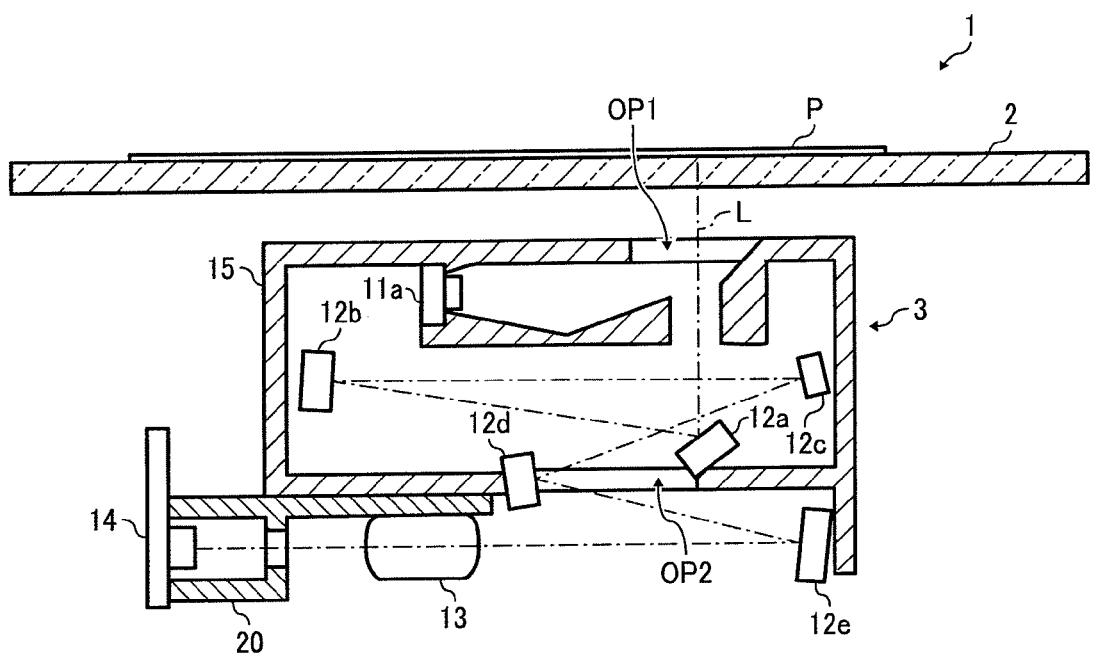
FIG. 4 is a view of a variant for the second embodiment of the document read-out apparatus according to the present invention, FIG. 5(*a*) is a view illustrating a thickness of an opening formed on a lower surface of an optical unit, FIG. 5(*b*) is an exemplary view for comparison in which reflective mirrors are arranged and an angle of light between the reflective mirrors is close to a right angle to the document surface.

Further, FIG. 4 is a view illustrating a variant of an arrangement shown in FIG. 3. The LED and the like is employed as the light source 11b in a similar manner to the embodiment of FIG. 2.

Although, in the embodiments shown in FIGS. 1 and 2, the final reflective mirror 12e, the image forming lens 13, and the light receiving sensor 14 is directly attached to an outer surface of the optical unit 3 (the housing 15), in the embodiments shown in FIGS. 3 and 4, the attachment member 20 is attached to the bottom surface of the optical unit 3 (the housing 15) and the reflective mirror 12e, the image forming sensor 13, and the light receiving sensor 14 are attached to the optical unit 3 (the housing 15) via this attachment member 20.

In this way, it is possible to further reduce the influences upon the optical elements due to the heat evolved by the light source with the interspoare of the attachment member.

Since the positional accuracies of the light receiving sensor 14 and the image forming lens 13 particularly provide the influences on the optical performance thereof, it is preferable to employ a quality of the material durable (whose coefficient of linear expansion is small) against the rise in temperature.

Further, according to the present invention, the opening OP2 provided on the bottom surface is formed between the reflective mirror 12e and the reflective mirror 12d, the former being positioned right before the image forming lens 13 into which the light enters, and the latter being positioned in a position further closer to the image forming lens 13. If the optical path between both the mirrors is positioned closer and in parallel to the surface of the document, the magnitude of the opening becomes larger, thereby enabling the thickness of the optical unit to be thinner.

Thereby, it is possible to more efficiently flow the cool air into the optical unit and also possible to more miniaturize the optical unit.

Figure 5A:
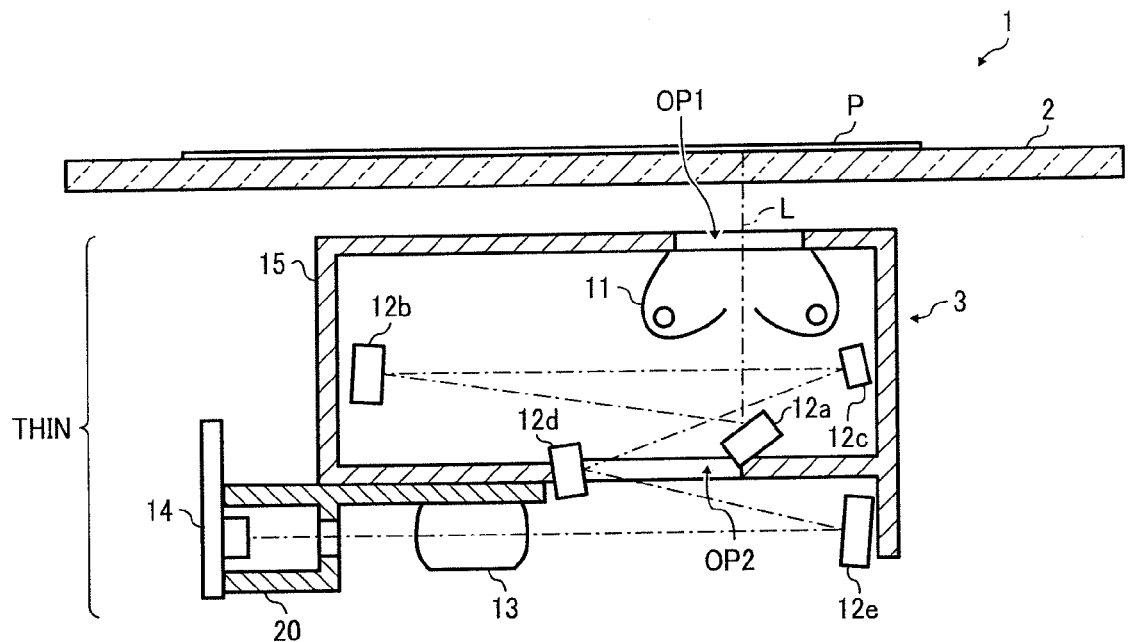
Figure 5B:
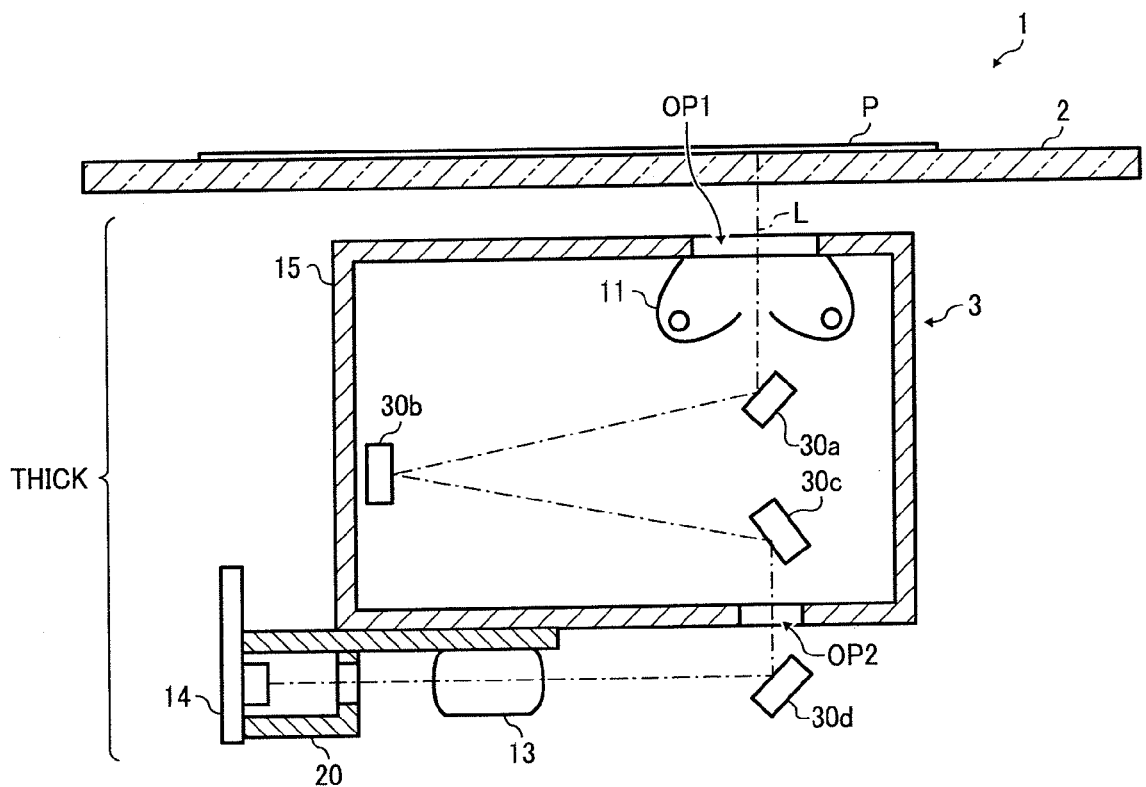

FIG. 5($a$) is a view illustrating the thickness and size of the optical unit in which an angle of light between the final reflective mirror and the reflective mirror positioned prior to the final reflective mirror is differentiated.

FIG. 5($a$) has the same structure as that of an embodiment shown in FIG. 3. The angle of light between the final reflective mirror 12e and the reflective mirror 12d positioned prior to the final reflective mirror is adapted to be parallel to the document surface. FIG. 5($b$) is an exemplary view for comparison in which reflective mirrors 30a to 30d are arranged and an angle of light between the reflective mirrors 30d and 30c is close to a right angle to the document surface.

As understood from the FIG. 5($a$) and FIG. 5($b$), in FIG. 5($a$), as a result of arranging the reflective mirrors 12e and 12d so that an angle of light between the reflective mirrors 12e an 12d is adapted to be parallel to the document surface, the size of the opening OP2 formed at the bottom surface is larger in comparison with the opening OP1 of the embodiment of FIG. 5($b$).

Figure 6:
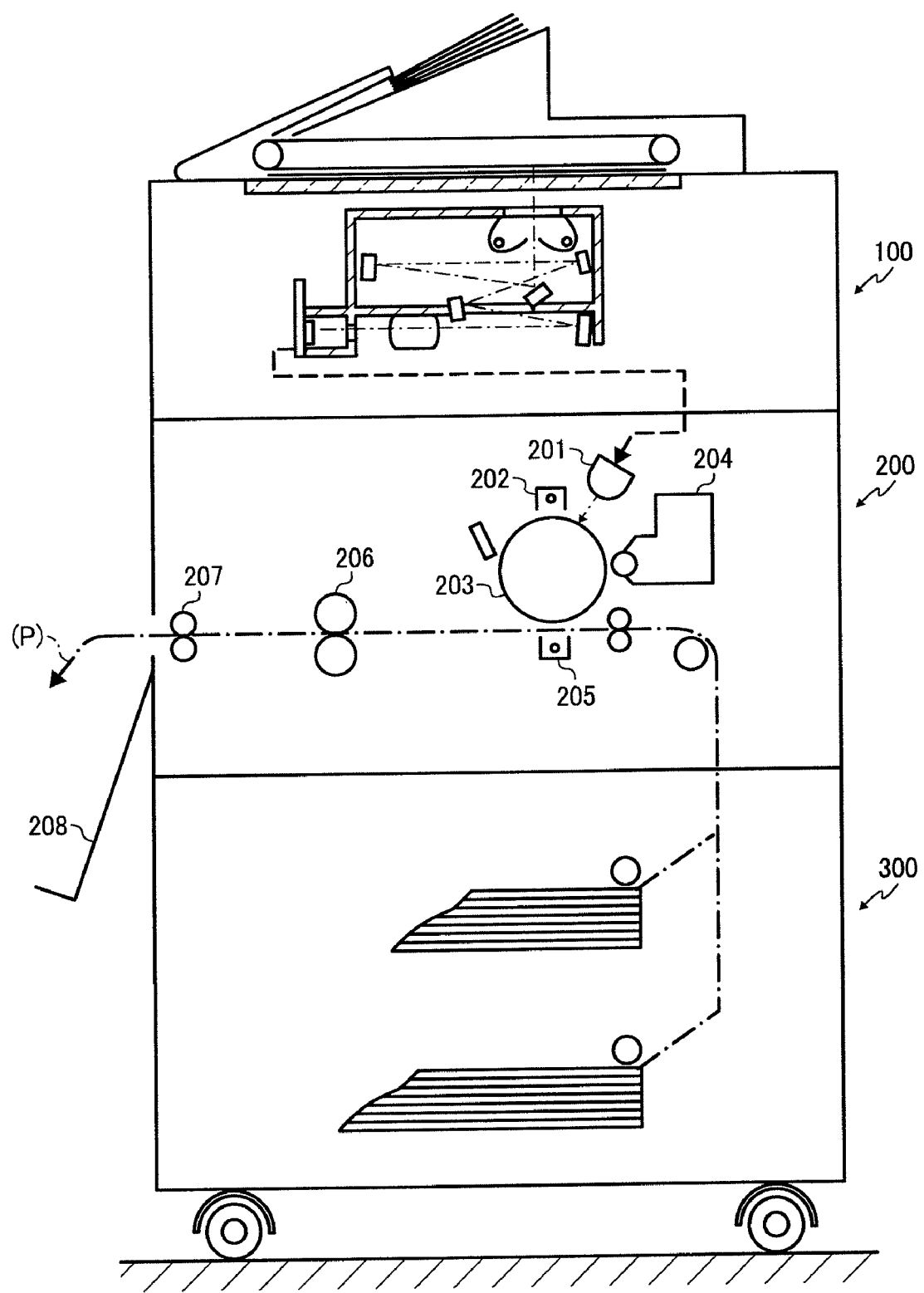
FIG. 6 is a view of one example of an image forming apparatus equipped with an image read-out device.

FIG. 6 is a view illustrating one example of a image forming apparatus having an image read-out device according to the present invention.

As shown in FIG. 6, the image forming apparatus for forming an image based upon an image data read out from the document includes an image read-out portion 100 which reads out the image data by an integrally formed scanning optical unit 3 according to the present invention, and an image forming portion for forming an image based upon the image data read out by the image read-out portion 100.

Among the figures, as the integrally formed scanning optical unit, although an example shown in FIG. 1 is illustrated, the other units shown in FIGS. 2 to 4 may be substituted therefor.

Further, in a lower portion of the image forming portion 200, a paper supplying apparatus 300 on which the image forming portion 200 is mounted and to which papers are supplied, are arranged. In the image read-out portion 100, an image data of a document image on the document is read out.

According to an electrophotography for forming a toner image based upon the image data, by emitting laser diode of a latent image forming device 201, an image carrier 203 which is uniformly charged by a charging device 202 or an electrostatic latent image is formed on a photosensitive body drum having a drum shape.

The electrostatic latent image formed by emitting the latent image forming device 201 or the laser diode is made to a toner image by a developing device 204.

The toner image formed by the developing device 204 is transferred onto a paper which is conveyed from a paper supplying apparatus 300, by a transfer device 205.

The toner image transferred onto the paper by the transfer device 205 is heated and pressurized by a fixing device 206. Thereafter, the paper onto which the toner image is formed is adapted to be sent out into a paper discharging tray 208 and stored in the same.

Such an image forming device prevents the thermal expansion of the optical system components as temperature sequentially rises, by efficiently discharging the heat through an opening portion of the integrally formed scanning optical unit in a read-out portion, the read-out accuracy is not deteriorated and, as a result, a clear image output results can be obtained.

As arranged above, according to the present invention, by efficiently discharging the heat evolved, thermal expansion of the optical components accompanying with the sequential temperature rise can be avoided and, thus, the read-out accuracy cannot be degraded and the image read out becomes clear.

Although the preferred embodiment of the present invention have been described, it should be noted that the present invention is not limited to those embodiments, various modifications and changes can be made to the embodiments.

What is claimed is:

1. An image read-out device comprises an integrally formed scanning optical unit in which a light source which emits light toward a document, a plurality of reflective mirrors reflecting the light which is emitted from the light source to the document and then reflected, an image forming lens converging the light reflected by a final reflective mirror which finally reflects the light, among the plurality of mirrors, and a light receiving sensor for receiving the light converged by the image forming lens are integrally mounted on a housing, wherein the integrally formed scanning optical unit moves in a scanning direction and reads out an image of the document,
   wherein an opening is provided on each of top and bottom surfaces of the housing, and wherein the area of the opening provided on the bottom surface is equal or more than that of the opening provided on the top surface.

2. The image read-out device as claimed in claim 1, wherein the opening formed on the top surface of the housing is an opening for exiting the light from the optical source toward the document.

3. The image read-out device as claimed in claim 1, wherein an opening provided on a bottom surface of the housing is formed between the final reflective mirror among the plurality of reflective mirrors and a reflective mirror arranged just prior to the final reflective mirror.

4. The image read-out device as claimed in claim 1, wherein the final reflective mirror, the image forming lens, and the light receiving sensor are arranged via an attachment member provided on a bottom surface of the housing.

5. The image forming apparatus wherein it comprises the image read-out device as claimed in claim 1.

* * * * *